United States Patent [19]
Saito

[11] Patent Number: 5,877,262
[45] Date of Patent: Mar. 2, 1999

[54] POLYESTER RESIN AND PROCESS FOR THE PRODUCTION THEREOF

[75] Inventor: Tatsuya Saito, Fujinomiya, Japan

[73] Assignee: Polyplastics Co., Ltd., Japan

[21] Appl. No.: 945,982

[22] PCT Filed: Jun. 19, 1996

[86] PCT No.: PCT/JP96/01691

§ 371 Date: Nov. 12, 1997

§ 102(e) Date: Nov. 12, 1997

[87] PCT Pub. No.: WO97/00279

PCT Pub. Date: Jan. 3, 1997

[30] Foreign Application Priority Data

Jun. 19, 1995 [JP] Japan ..................................... 7-151430

[51] Int. Cl.$^6$ ....................................................... C08F 20/00
[52] U.S. Cl. ........................... 525/437; 528/271; 528/272; 528/298; 528/308; 528/308.6
[58] Field of Search ..................................... 528/271, 272, 528/298, 308, 308.6, 503; 525/437

[56] References Cited

FOREIGN PATENT DOCUMENTS

| | | |
|---|---|---|
| A-50-126040 | 10/1975 | Japan . |
| A-52-87134 | 7/1977 | Japan . |
| A-55-7874 | 1/1980 | Japan . |
| A-3-93831 | 4/1991 | Japan . |
| A-4-91126 | 3/1992 | Japan . |
| A 4-272920 | 9/1992 | Japan . |
| A-6-172503 | 5/1994 | Japan . |

*Primary Examiner*—Samuel A. Acquah
*Attorney, Agent, or Firm*—Nixon & Vanderhye P.C.

[57] ABSTRACT

A polyester resin decreased in the amount of an organic gas generated therefrom during molding thereof and during use thereof at high temperatures, having a substantially linear structure mainly comprising constituent units of an aromatic dicarboxylic acid or an aliphatic dicarboxylic acid and constitutional units of an aliphatic diol, the terminals thereof are substituted by a monofunctional compound having a carboxyl or hydroxyl group, and the hydroxyl terminal group content thereof is 40 meq/kg or less.

8 Claims, No Drawings

POLYESTER RESIN AND PROCESS FOR THE PRODUCTION THEREOF

BACKGROUND OF THE INVENTION

1. Technical Field of the Invention

The present invention relates to a polyester resin decreased in the amount of an organic gas generated therefrom during molding thereof and during use thereof at high temperatures, and a process for preparing the same.

2. Description of Related Art

Polyester resins such as copolymers comprising a polybutylene terephthalate or polybutylene naphthalate and further a polytetrahydrofuran and adipic acid as the constituent units are used as materials for electric components and automotive parts by taking advantage of excellent properties of them. Particularly, in recent years, they have come to be used under severe conditions including a high temperature and a high humidity. When an ordinary polyester resin is used for such a purpose, it is easily hydrolyzed or pyrolyzed to generate a gas. Particularly when the resin is positioned near an electric contact, problems are posed that, for example, the generated gas is carbonized by the arc discharge to form a deposit near the electric contact to cause an abnormal conduction at the contact. Since this problem is serious particularly in a low-molecular material excellent in fluidity, the compatibility of a high fluidity with a decreased amount of the generated gas with each other has been a difficult problem. For solving these problems, for example, there were proposed a process wherein the amount of the carboxyl terminal group is reduced and, in particular, a process wherein solid phase polymerization is conducted, particularly, a process wherein solid phase polymerization is conducted after copolymerizing a polyfunctional compound and a monofunctional compound in a specified ratio (JP-A-4-272920).

However, in the process wherein the amount of the carboxyl terminal group is reduced, the decrease in the amount of the generated gas is yet insufficient; and in the process wherein solid phase polymerization is conducted, a problem that the fluidity of the resin is lost to make the formation of a thin molding difficult is caused. When solid phase polymerization is conducted after copolymerizing a polyfunctional compound and a monofunctional compound, the Theological characteristics of the resin are changed to increase the viscosity thereof under a low shearing condition and, therefore, such a process has the problem of a brittleness lower than that of a (co)polymer having the same fluidity but prepared by other processes.

DISCLOSURE OF THE INVENTION

SUMMARY OF THE INVENTION

An object of the present invention is to provide a polyester resin not impaired in the high fluidity and decreased in the amount of an organic gas generated therefrom and also a process for producing such a polyester resin without using techniques such as branching, wherein the Theological characteristics are changed.

The inventors have made intensive investigations for the purpose of solving the above-described problems. As the result of the studies, they have found that the amount of an organic gas generated from a polyester resin during molding thereof and during use thereof can be decreased and the material excellent in fluidity can be provided by substituting the terminals of the polyester resin by a monofunctional compound having a carboxyl or hydroxyl group and controlling the hydroxyl terminal group content thereof to be below a specified value, and then, the present invention has been completed on the basis of this finding.

That is, the present invention relates to a polyester resin having a substantially linear structure mainly comprising constituent units of an aromatic dicarboxylic acid or an aliphatic dicarboxylic acid and constituent units of an aliphatic diol, characterized in that the terminals thereof are substituted by a monofunctional compound having a carboxyl or hydroxyl group, and that the hydroxyl terminal group content thereof is 40 meq/g or less; and also to a process for preparing a polyester resin having a hydroxyl terminal group content of 40 meq/kg or less and a substantially linear structure mainly comprising constituent units of an aromatic dicarboxylic acid or an aliphatic dicarboxylic acid and constituent units of an aliphatic diol, characterized in that a monofunctional compound having a carboxyl or hydroxyl group is added either before the start of esterification or transesterification of the starting monomer materials or in an arbitrary stage of the reaction to effect melt polymerization thereof, followed by solid-phase polymerization thereof.

Now the present invention will be described in detail.

DETAILED DESCRIPTION OF THE INVENTION

The polyester resin of the present invention mainly comprises constituent units of an aromatic dicarboxylic acid or an aliphatic dicarboxylic acid and constituent units of an aliphatic diol, and is characterized in that the terminals thereof are substituted by a monofunctional compound having a carboxyl or hydroxyl group, and that the hydroxyl terminal group content thereof is 40 meq/kg or less, as described above.

Usable starting monomers forming the main skeleton of the polyester resin are the above dicarboxylic acids and diols and ester-forming derivatives thereof. Examples of the aromatic dicarboxylic acids, aliphatic dicarboxylic acids and ester-forming derivatives thereof herein include terephthalic acid, isophthalic acid, phthalic acid, naphthalenedicarboxylic acid, biphenyldicarboxylic acid, stilbenedicarboxylic acid, 2,2-(biscarboxyphenyl)propane, succinic acid, adipic acid, sebacic acid, dodecanedicarboxylic acid and ester-forming derivatives thereof such as alkyl esters. Examples of the aliphatic diols include ethylene glycol, 1,3-propanediol, 1,4-butanediol, 1,6-hexanediol, diethylene glycol and triethylene glycol. The polyesters usable in the present invention include also ones further copolymerized with another component so far as the polyesters comprise the above-described dicarboxylic acid and diol as the main constituent units.

Monofunctional compounds which will be specified below are particularly effective in substituting the terminals of particularly, among the above-mentioned polyester resin, a polybutylene terephthalate resin mainly comprising constituent units of terephthalic acid and butanediol and a polybutylene naphthalate resin mainly comprising constituent units of naphthalenedicarboxylic acid and butanediol, and thus a remarkable decrease in the amount of an organic gas mainly comprising tetrahydrofuran is possible.

The number average molecular weight of the polyester resin is preferably 8,000 to 40,000, particularly preferably 8,000 to 25,000 for obtaining a remarkable effect of decreasing the amount of the organic gas.

The monofunctional compounds having a carboxyl or hydroxyl group used for substituting the terminals of the polyester resin are not particularly limited. However, monofunctional compounds having at least seven carbon atoms are preferred because compounds having a low molecular weight are not introduced into the polymer terminals but easily volatilized out of the reaction system depending on the temperature, the degree of reduction of the pressure, and other conditions in the preparation of the polyester. Examples of particularly preferred compounds include aromatic carboxylic, acid compounds such as benzoic acid, toluic acid, tert-butylbenzoic acid and naphthoic acid, derivatives thereof such as alkyl esters, and high-molecular weight alcohol compounds such as phenoxybenzyl alcohol.

The polyester resin of the present invention is preferably prepared by a process which will be described below by using the above-described starting monomers for the polyester resins and specified monofunctional compounds for substituting the terminals thereof.

For the melt polymerization, known methods such as a direct polymerization or transesterification method are employed. The catalysts are preferably titanium, tin, antimony and germanium compounds. In the polymerization, the monofunctional compound is added either in the monomer material-feeding step before the start of transesterification or esterification or in an arbitrary stage of the transesterification, or esterification, but preferably, not in the final stage of the reaction.

The amount (molar concentration based on the unit weight of the final polyester) of the monofunctional compound to be added is preferably determined so that the concentration (m) (mmol/kg) of the monofunctional compound to be added satisfies the following formula (1):

$$(t-120)/A < m < (t-20)/A \qquad (1)$$

wherein t is the total equivalent concentration (hereinafter referred to as the total terminal group content) (meq/kg) of the amount of all the kinds of the terminal groups, which is substantially inevitably determined from the number-average molecular weight corresponding to the intended fluidity of the polyester to be obtained, and A is a proportion (introduction rate) of the amount of the monofunctional compound introduced into the terminals of the polymer through a reaction to the amount thereof added.

A is a value which is variable depending on the monofunctional compound used and, therefore, it must be previously determined by experiments or the like.

In the polyester resin of the present invention, the amount of the hydroxyl terminal group which affects the amount of the gas to be generated [i.e. the hydroxyl group bonded to the hydrocarbon group, excluding the hydroxyl group in the carboxyl group (hydroxyl group bonded to the carbonyl group)] is decreased to 40 meq/kg or less by the substitution of the terminals by the monofunctional compound and the solid phase polymerization. The amount of the hydroxyl terminal group is preferably 20 meq/kg or less. To attain the amount of the hydroxyl terminal group of 40 meq/kg or less, preferably 20 meq/kg or less, the solid phase polymerization is conducted preferably at a temperature lower by 5° C. to 50° C. than the melting point of the polyester resin for at least 15 hours, still preferably at a temperature lower by 5° C. to 35° C. than the melting point of the polyester resin for at least 20 hours.

The polyester resin provided by the present invention is used, if necessary, in combination with a suitable heat stabilizer, an ultraviolet absorber, an antistatic agent, a flame retardant, a flame-retarding assistant, a colorant such as a dye or pigment, a lubricant for improving the fluidity and releasability, an antifriction, a crystallization accelerator (nucleating agent), and an inorganic substance.

The polyester resin of the present invention can be used in combination with other assistant thermoplastic resins so far as the object of the invention is not disturbed. Other thermoplastic resins usable in the present invention include, for example, polyolefin-based polymers, polyamide-based polymers, polycarbogates, ABS, polyphenylene oxides, polyalkyl acrylates, polyacetals, polysulfones, polyether sulfones, polyether imides, polyether ketones, and fluororesins. These thermoplastic resins may be used also in the form of a mixture of two or more of them.

The polyester resin to be provided by the present invention, prepared by the addition of the monofunctional compound followed by the melt polymerization and solid phase polymerization, is excellent in the fluidity, has general properties such as rheological characteristics and thermal resistance not inferior to those of ordinary polyester resins, and is decreased in the amount of an organic gas generated therefrom during molding thereof and during use thereof and, therefor, it is a suitable material for electric components.

EXAMPLES

The present invention will now be further described with reference to the following Examples, which by no means limit the invention.

Example 1

To obtain 2.5 kg of polybutylene terephthalate (PBT) having a number average molecular weight of 16000, namely a total terminal group content of 124 meq/kg and a hydroxyl terminal group content of 40 meq/kg or less, 2178 g of dimethyl terephthalate, 1415 g of butanediol, 1.25 g of tetrabutyl titanate, and p-tert-butylbenzoic acid were fed into a reactor provided with a stirrer and a rectification column. Since it had been found in the preliminary experiment that the reaction introduction rate of p-tert-butylbenzoic acid was 0.72 under the same reaction conditions as those of Example 1, the amount of p-tert-butylbenzoic acid added was 42.0 g corresponding to 94.4 mmol/kg which satisfies the above formula (1). The transesterification and esterification reactions were conducted by elevating the temperature from 140° C. to 200° C. during the period of 90 min. In this stage, the quantities of methanol and water reached about 90% of the theoretical amount. The distillation path was switched over to a direct cooling column connecting the rectification column with a vacuum pump, and the pressure was gradually reduced while the temperature was elevated from 200° C. to 250° C. The pressure was thus reduced to 0.5 Torr after about 40 min. The polymerization reaction was conducted at 250° C. under 0.5 Torr for 2 h and then the obtained polymer was taken out and pelletized. The molecular weight of the polymer was determined by gel permeation chromatography to find that the number average molecular weight thereof was 8200. After the solid phase polymerization of the product at 200° C. in a nitrogen stream for 30 h, the obtained polymer had a number average molecular weight of 16300, a hydroxyl terminal group content of 9.1 meq/kg and a carboxyl terminal group content of 31 meq/kg. The polymer thus obtained was molded at 250° C., pulverized, and subjected to the quantitative analysis of the gas generated by leaving the obtained powder to stand at 150° C. for 1 h. Also the obtained polymer was left to stand in molten state at 260° C. for 10 min and subjected to the quantitative determination of the gas thus generated. Further, the melt viscosity of the product at 250° C. was determined with a capillograph. The results are given in Table 1.

Example 2

To obtain 2.5 kg of polybutylene napthalate (PBN) having a number average molecular weight of 20000, mamely a total terminal group content of 100 meq/kg and a hydroxyl terminal group content of 40 meq/kg or less, 2232 g of 2,6-dimethyl naphthalate, 1153 g of butanediol, 10.0 g of tetrabutyl titanate, and p-tert-butylbenzoic acid were fed into a reactor provided with a stirrer and a rectification column. Since it had been found in the preliminary experiment that the reaction introduction rate of p-tert-butylbenzoic acid was 0.76 under the same reaction conditions as those of Example 2, the amount of p-tert-butylbenzoic acid added was 27.0 g corresponding to 60.5 mmol/kg which satisfies the above formula (1). The transesterification and esterification reactions were conducted by elevating the temperature from 160° C. to 220° C. during the period of 90 min. In this stage, the quantities of methanol and water reached about 90% of the theoretical amount. The distillation path was switched over to a direct cooling column connecting the rectification column with a vacuum pump, and the pressure was gradually reduced while the temperature was elevated from 220° C. to 260° C. The pressure was thus reduced to 0.5 Torr after about 30 min. The polymerization reaction was conducted at 260° C. under 0.5 Torr for 1.5 h and then the obtained polymer was taken out and pelletized. The molecular weight of the polymer was determined by gel permeation chromatography to find that the number average molecular weight thereof was 9100. After the solid phase polymerization of the product at 210° C. in a nitrogen stream for 30 h, the obtained polymer had a number average molecular weight of 21100, a hydroxyl terminal group content of 8 meq/kg and a carboxyl terminal group content of 36 meq/kg. The gas generated from the resultant PBN was analyzed in the same manner as that of Example 1. The results are given in Table 1.

Example 3

To obtain 2.5 kg of polybutylene terephthalate (PBT) having a number average molecular weight of 15000, namely a total terminal group content of 131 meq/kg and a hydroxyl terminal group content of 40 meq/kg or less, 2178 g of dimethyl terephthalate, 1415 g of butanediol, 1.25 g of tetrabutyl titanate, and p-toluic acid were fed into a reactor provided with a stirrer and a rectification column. Since it had been found in the preliminary experiment that the reaction introduction rate of p-toluic acid was 0.63 under the same reaction conditions as those of Example 3, the amount of p-toluic acid added was 41.1 g corresponding to 120.6 mmol/kg which satisfies the above formula (1). The transesterification and esterification reactions were conducted by elevating the temperature from 140° C. to 200° C. during the period of 90 min. In this stage, the quantities of methanol and water reached about 90% of the theoretical amount. The distillation path was switched over to a direct cooling column connecting the rectification column with a vacuum pump, and the pressure was gradually reduced while the temperature was elevated from 200° C. to 250° C. The pressure was thus reduced to 0.5 Torr after about 50 min. The polymerization reaction was conducted at 250° C. under 0.5 Torr for 2 h and then the obtained polymer was taken out and pelletized. The molecular weight of the polymer was determined by gel permeation chromatography to find that the number average molecular weight thereof was 8600.

After the solid phase polymerization of the product at 200° C. in a nitrogen stream for 25 h, the obtained polymer had a number average molecular weight of 15200, a hydroxyl terminal group content of 9.5 meq/kg and a carboxyl terminal group content of 31 meq/kg. The gas generated from the resultant PBT was analyzed in the same manner as that of Example 1. Further, the melt viscosity of the product: at 250° C. was determined with a capillograph. The results are given in Table 1.

Comparative Example 1

PBT was synthesized in the same manner as that of Example 1 except that 1.33 g, corresponding to 3 mmol/kg which was below the lower limit of the range defined by the above formula (1), of p-tert-butylbenzoic acid was added and that no solid phase polymerization was conducted. The polycondensation time was 1 h 45 min. The polymer was taken out and the number average molecular weight thereof was determined to find that it was 16500 substantially equal to that of the polymer obtained in Example 1, but the hydroxyl terminal group content thereof was 82 meq/kg. The amount of the gas generated from the polymer was determined in the same manner as that of Example 1 to find that it was very large as shown in Table 1. The melt viscosity was determined in the same manner as that of Example 1 to find that the melt viscosity of the polymer obtained in Comparative Example 1 was almost the same as that of the polymer obtained in Example 1. It is apparent therefore that the polymer of Example 1 was not different from that of Comparative Example 1 in the shear rate dependence.

Comparative Example 2

The melt polymerization was conducted in the same manner as that of Comparative Example 1 except that the polymer was taken out after the polycondensation time of 1 h 20 min. Then the solid phase polymerization was conducted at 185° C. for 7 h. The polymer thus obtained had a number average molecular weight of 16100 and a hydroxyl terminal group content of 85 meq/kg. The gas generated from the polymer was determined in the same manner as that of Example 1 to find that it was very large as shown in Table 1.

Comparative Example

The melt polymerization was attempted in the same manner as that of Example 1 except that 84.0 g, corresponding to 190 mmol/kg which was above the upper limit of the range defined by the above formula (1), of p-tert-butylbenzoic acid was added. The reaction did not completely proceed and PBT having an intended number average molecular weight could not be obtained. Then 50.3 g of trimethyl trimellitate was further added and the melt polymerization was conducted in the same manner as that of Example 1. The polymerization time was 2 h. The polymer thus formed was taken out and then the solid phase polymerization thereof was conducted at 200° C. for 25 h. The polymer thus obtained had a number average molecular weight of 15500 and a hydroxyl terminal group content of 9 meq/kg. The amount of the generated gas and the melt viscosity were determined in the same manner as that of Example 1. As a result, it was found that although the amount of the generated gas was as low as that generated from the polymer in Example 1, PBT obtained by this process had a branched structure and a stronger shear rate dependence.

Comparative Example 4

PBN was synthesized in the same manner as that of Example 2 except that no p-tert-butylbenzoic acid was used and no solid phase polymerization was conducted. The polymer thus formed was taken out after a melt polymerization time of 1 h 10 min, and the number average molecular weight was determined to find that it was 19900 which was almost equal to that of the polymer obtained in Example 2. However, the hydroxyl terminal group content was 65 meq/kg. The amount of the generated gas was determined to find that it was far larger than that generated from the polymer obtained in Example 2 as-shown in Table 1.

TABLE 1

| | Resin | Av. mol. wt. | Amt. of generated gas (ppm) | | Melt viscosity (poise) | |
|---|---|---|---|---|---|---|
| | | | 150° C., 1 h | 160° C., 10 min | 100 sec$^{-1}$ | 3000 sec$^{-1}$ |
| Ex. 1 | PBT | 16300 | 19 | 28 | 1600 | 790 |
| Ex. 2 | PBN | 21100 | 12 | 22 | — | — |
| Ex. 3 | PBT | 15200 | 20 | 29 | 1460 | 730 |
| Comp. Ex. 1 | PBT | 16500 | 114 | 243 | 1620 | 800 |
| Comp. Ex. 2 | PBT | 16100 | 86 | 155 | — | — |
| Comp. Ex. 3 | PBT | 15500 | 21 | 35 | 1800 | 700 |
| Comp. Ex. 4 | PBN | 19900 | 76 | 96 | — | — |

I claim:

1. A polyester resin having a substantially linear structure and a hydroxyl terminal group content of 40 meq/kg or less, wherein said polyester resin is a polybutylene terephthalate resin consisting essentially of constituent units derived from terephthalic acid and butanediol, or a polybutylene naphthalate resin consisting essentially of constituent units derived from naphthalenedicarboxylic acid and butanediol, wherein terminal units thereof are substituted by a $C_8$ or greater monofunctional compound having a carboxyl group or a derivative thereof, and wherein said monofunctional compound is added either before the start of esterification or transesterification of the starting monomer materials or in an arbitrary stage of the reaction to effect melt polymerization thereof, followed by solid-phase polymerization thereof.

2. The polyester resin as claimed in claim 1, wherein the hydroxyl terminal group content is 20 meq/kg or less.

3. The polyester resin as claimed in claim 1, wherein the monofunctional compound is a compound selected from the group consisting of toluic acid and tert-butylbenzoic acid.

4. A process for preparing a substantially linear polyester resin having a hydroxyl terminal group content of 40 meq/kg or less which is a polybutylene terephthalate resin consisting essentially of constituent units derived from terephthalic acid and butanediol, or a polybutylene naphthalate resin consisting essentially of constituent units derived from naphthalenedicarboxylic acid and butanediol, comprising incorporating a $C_8$ or greater organic monofunctional compound having a carboxyl or hydroxyl group either before the start of esterification or transesterification of the starting monomer materials or in an arbitrary stage of the reaction to effect melt polymerization thereof, followed by solid-phase polymerization thereof at a temperature lower by 5° C. to 50° C. than the melting point of the resulting polyester resin for at least 15 hours, and wherein said monofunctional compound is incorporated in an amount which satisfies the following formula (1):

$$(t-120)/A < m < (t-20)/A \qquad (1)$$

wherein m is the amount in mmol/kg of the monofunctional compound to be added; t is the total terminal group content in meq/kg corresponding to the desired number-average molecular weight of the resulting polymer after solid phase polymerization; and A is the proportion of the amount of the monofunctional compound introduced into the terminals of the polymer through reaction to the amount thereof added.

5. The process for preparing a polyester resin as claimed in claim 4, wherein the monofunctional compound is a compound selected from the group consisting of benzoic acid, toluic acid, tert-butylbenzoic acid, naphthoic acid, phenoxybenzyl alcohol, and derivatives thereof.

6. The process for preparing a polyester resin as claimed in claim 4, wherein the solid phase polymerization is effected at a temperature lower by 5° C. to 35° C. than the melting point of the resulting polyester resin for at least 20 hours.

7. The polyester resin as in claim 1, wherein the monofunctional compound is a $C_8$ or higher carboxylic acid or derivatives thereof.

8. The process for preparing a polyester resin as claimed in claim 4, wherein the monofunctional compound is a $C_8$ or higher carboxylic acid or a derivative thereof.

* * * * *